March 23, 1954 F. A. KRUSEMARK 2,673,117
ADJUSTABLE VISION VISOR
Filed April 21, 1950 3 Sheets-Sheet 1
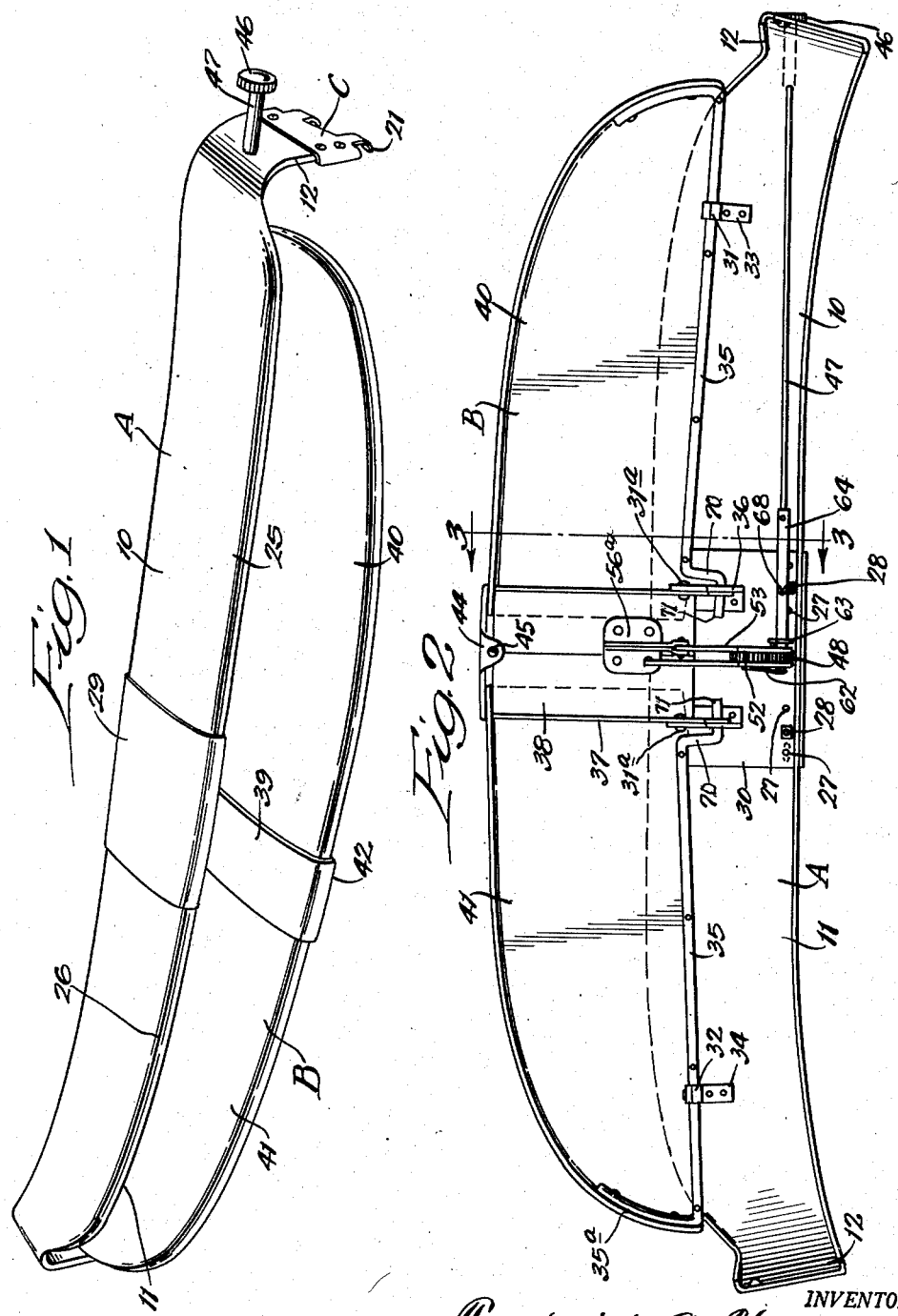
INVENTOR:
Frederick A. Krusemark,
BY Dawson, Orms, Booth and Spangenberg,
ATTORNEYS.

March 23, 1954  F. A. KRUSEMARK  2,673,117
ADJUSTABLE VISION VISOR
Filed April 21, 1950  3 Sheets-Sheet 2
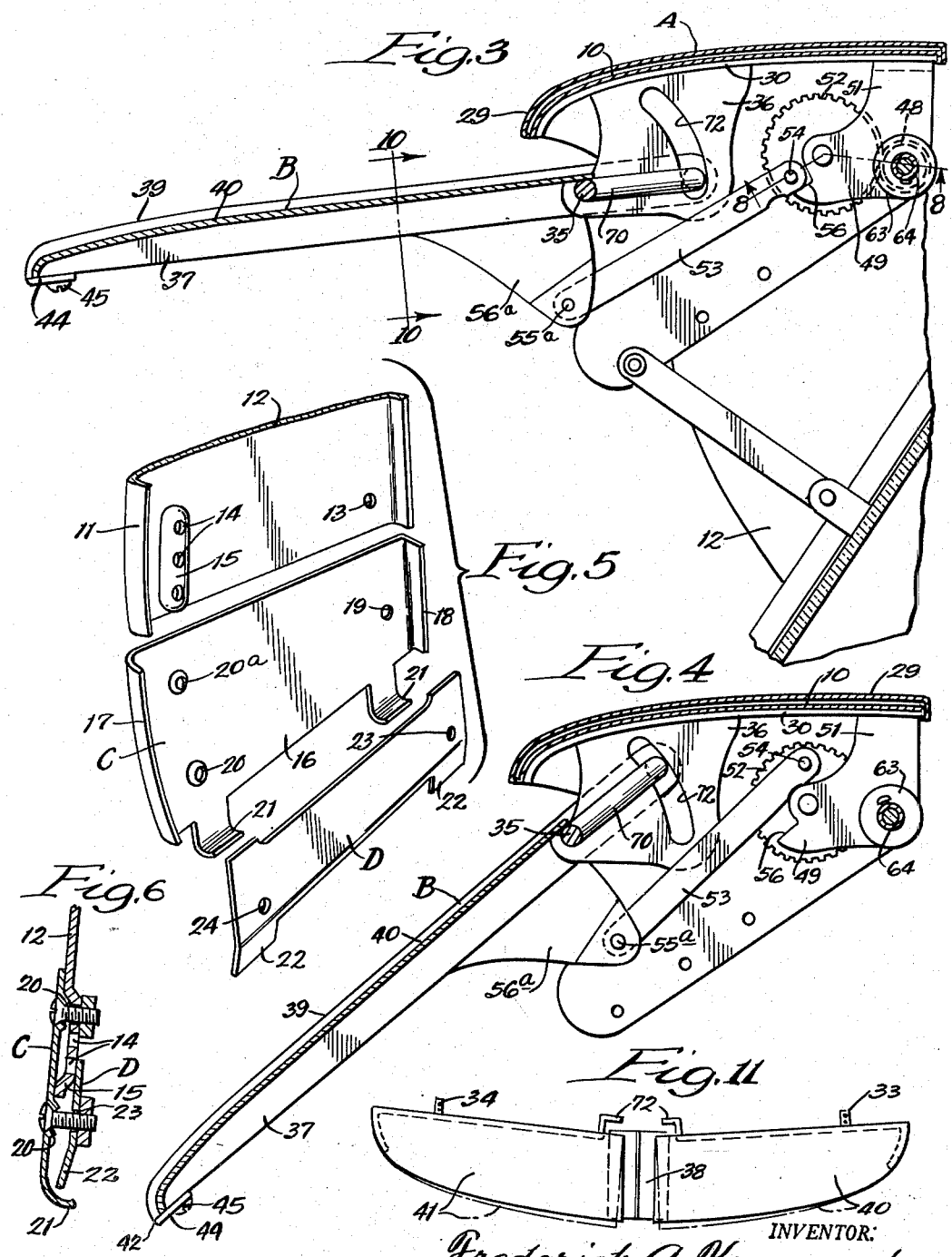
INVENTOR:
Frederick A. Krusemark,
BY Dawson, Ooms, Booth and Spangenberg,
ATTORNEYS.

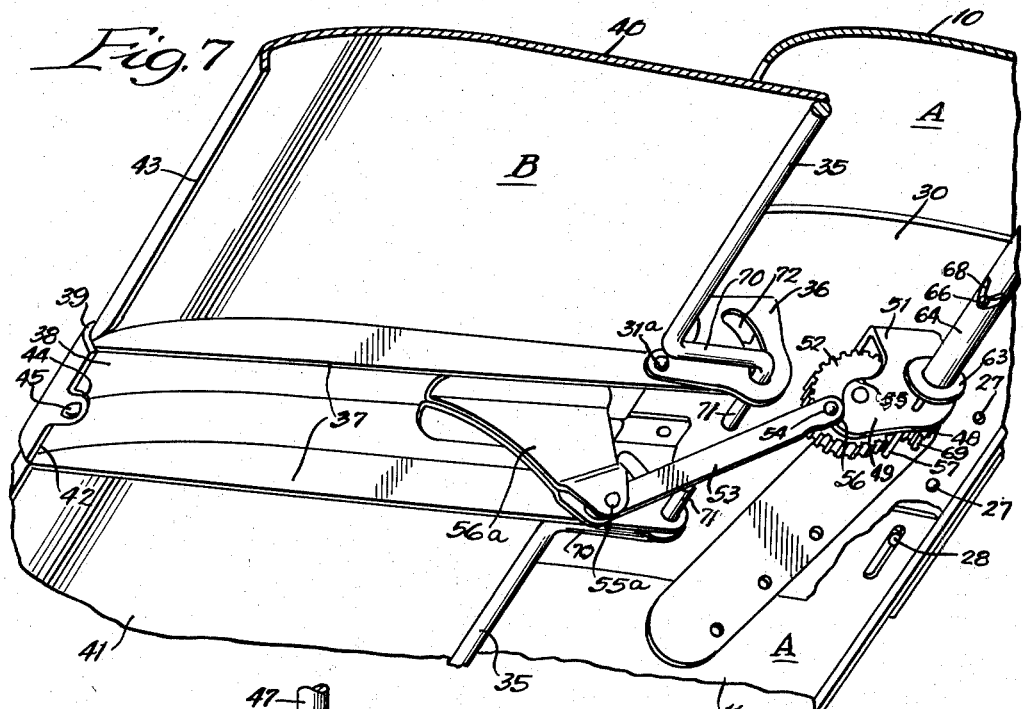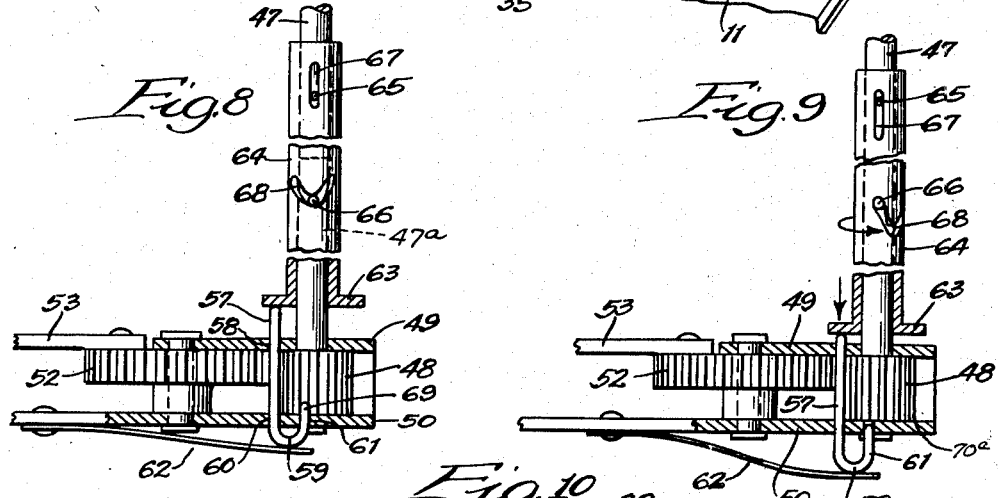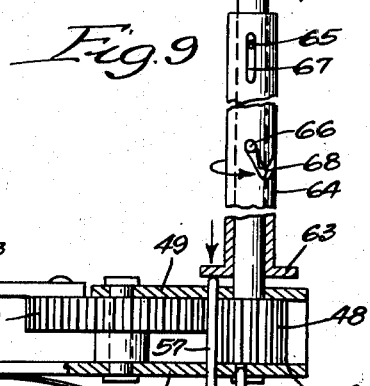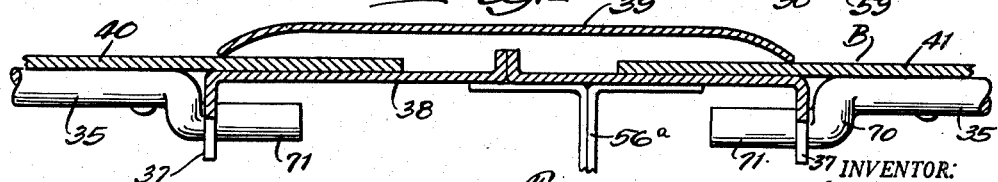

Patented Mar. 23, 1954

2,673,117

UNITED STATES PATENT OFFICE 2,673,117

ADJUSTABLE VISION VISOR

Frederick A. Krusemark, Chicago, Ill.

Application April 21, 1950, Serial No. 157,361

9 Claims. (Cl. 296—95)

This invention relates to a visor structure for use over the windshield of an automotive vehicle and it relates more particularly to a new and improved visor assembly which may be adapted to give an attractive appearance and desirable protection when used with vehicles having windshields of compound curvature.

It is an object of this invention to provide a visor structure which may be simply adjusted to vary its effect in accordance with the demands of existing conditions when used over a windshield of a commercial automotive vehicle.

It is another object to provide a visor of the type described having a fixed member and an adjustable member, and it is a related object to provide an improved means for mounting the assembly on the automotive vehicle without the necessity of drilling holes into the body parts and to provide means for enabling adjustment of the visor assembly to adapt its use in an effective manner with commercial vehicles of varying width.

A further object is to provide a visor of the type described, which is functionally adapted for use with vehicles having windshields of compound curvature and it is a further related object to provide means for automatically locking the pivotal member to prevent inadvertent adjustment while, at the same time, releasing the locking means responsive to actuation for adjustment of the pivoted unit.

A still further object is to produce a visor assembly of the type described which is formed of relatively few simple parts, simply arranged to provide a sturdy structure capable of resisting force to which it might be exposed during normal use.

These and other objects and advantages of this invention will hereinafter appear and for purposes of illustration but not of limitation, an embodiment is shown in the accompanying drawings in which:

Figure 1 is a perspective view of the assembled visor, embodying features of this invention;

Figure 2 is a plan view taken from the inside of the visor shown in Figure 1;

Figure 3 is a sectional view taken along the line 3—3 of Figure 2;

Figure 4 corresponds to the sectional view of Figure 3, but shows the position of the various parts when the pivoted visor unit is rocked to a lower position of adjustment;

Figure 5 is a perspective view of the parts which make up the clamping means by which the assembly is secured to the vehicle;

Figure 6 is a sectional view showing the relationship of the parts in Figure 5 in their assembled relation;

Figure 7 is a detail perspective view of the actuating means by which the pivoted part is rocked to the desired position of adjustment;

Figure 8 is a sectional view taken along the line 8—8 of Figure 3;

Figure 9 is similar to that of Figure 8, except that the parts are shown in their position upon actuation for adjustment;

Figure 10 is a sectional view taken along the line 10—10 of Figure 3 and

Figure 11 is a diagrammatic view showing the effect of the angular relationship of the parts forming the pivotal visor member.

Briefly described, invention is embodied in a visor structure having a stationary visor unit A which extends in a forwardly direction over the windshield of an automotive vehicle and another visor unit B pivoted from the stationary unit for movement in a vertical direction. Normally, the pivoted member is positioned to extend forwardly of the stationary member A which is secured to the vehicle. Both of the visor units A and B should be formed of rigid material which may be of non-transparent material such as metal or the like or of light filterable material such as colored glass, plastics or the like. Best results are secured when the stationary member is formed of metallic material while the pivoted member is formed of light filterable material such as glass or plastics.

Means within easy reach of the operator are embodied for selectively rocking the pivoted unit B to a desired position of adjustment, said means also including locking means which become automatically effective for securing the units in fixed relation while the adjustment means are inoperative, but are automatically rendered ineffective responsive to the application of forces operating to bring about desired adjustment of the pivoted unit.

In order to adapt the unit for various designs in commercial vehicles, the clamping means by which the design is secured to the vehicle is capable of various angular adjustments to coincide with the arrangement of the gutter adjacent the windshield and the assembly is also capable of adjustment in width without detracting from its operability or appearance.

An additional, important feature forming a part of this invention comprises means by which the visor assembly is adapted for use with vehicles having windshields of compound curvature.

In this arrangement, the fixed unit is designed to conform generally to the curvature of the vehicle member on which it is mounted, while the pivoted unit is adapted to swing about multiple axes in order to achieve satisfactory operation.

The stationary visor unit A comprises an elongate member 10 dimensioned to correspond substantially to the width of the vehicle portion over the windshield. In its mounted relation the unit extends in a generally forward direction over the windshield with a slight incline toward the downturned leading edge 11. In the plan view, it is of curvilinear contour corresponding with the similar line of the commercial vehicle. The end portions of the member 10 are downturned to form depending flanges 12 which are provided with an opening 13 in the rearward portion and a series of laterally spaced openings 14 in an embossed portion 15 in the forward end of the flange.

As illustrated in greater detail in Figures 5 and 6, this end arrangement is adapted to cooperate with clamping members C and D for establishing a mounted relation with the gutter portion adjacent the windshield of the vehicle.

Part C is a trapezoidal section 16 having end flanges 17 and 18 which correspond to that of the visor section A with an opening 19 in the rearward portion and a number of laterally spaced openings 20 and 20a in the forward end portion. Two or more downturned clamping lips 21 extend from the section 16 for cooperation with similarly spaced upturned extensions 22 on the strip member D for gripping the gutter therebetween when fastening means are employed securing the members C and D together with the flanged portion 12 disposed therebetween. Although various fastening means may be used, as shown in Figure 6, assembly for a specific gutter arrangement can be effected by joining the opening 23 at the rearward portion of the strip D with registered openings 19 and 13 as with bolt and nut means while also securing the opening 24 at the forward edge portion of the strip D while in registry with opening 20 in the other member. Opening 20a and one or the other of openings 14 in flange 12 are joined in registry to complete the clamping relation. The choice of openings 14 permits adaptation of the clamping means for effecting a firm gripping relation, notwithstanding the curvature or contour of the automotive part with which it is associated.

In order to have the visor assembly adjustable in width, the stationary visor member 10 is formed of two substantially identical sections 25 and 26 arranged in side by side spaced relation, as indicated in Figure 2. The inner rearward portion of each section is provided with a number of laterally spaced openings 27 through which fastening means, such as bolt 28, are inserted to secure the sections in their desired position of lateral spacing between a top cover plate 29 and a bottom base plate 30, each of which is of sufficient width to conceal the ends of the sections in any position of lateral adjustment.

Unit B, which appears as a streamlined arcuate member of lesser width than the stationary visor section previously described, is pivoted for rocking movement in the vertical direction from the underside of the base plate 30 and extends forwardly of the stationary visor when in position of normal use. As a unit, the member B is adapted to rock about pivots 31 and 32 formed of brackets 33 and 34 fixed to the under side of the stationary sections 25 and 26 respectively. The brackets have integral forwardly extending horizontally disposed sleeves in which torque rods 35 fixed to the rearward edge portion of the unit are operative. The ends of the members are turned forwardly for a short distance to conform to the contour of the curvilinear end sections of the units and, as employed, the rod members, in addition to their pivotal function serve to take care of the torque and impart rigidity across the members, especially when they are formed of lightweight metal or plastic sheet stock. As such, the torque rods prevent fluttering of the visor sections under normal use.

Additional support is also provided at a pivotal connection 31a formed between the forward end portions of laterally spaced ears 36 depending from the under side of the base plate 30 and downturned flanges 37 integral with a base plate 38 which, in cooperation with a cover plate 39, forms a housing in which the inner ends of laterally spaced sections 40 and 41 of which the pivotal unit is formed are free to slide relative to each other in the lateral direction. The cover plate 39 and the base plate 38, together with the sections 40 and 41, constitute a unitary assembly which rocks together upon actuation by means which will hereinafter be described. The cover plate 39 has a curvilinear downturned forward end portion 42 which conforms to the curvilinear leading edge 43 of the sections 40 and 41, and a lip 44, which extends rearwardly from the edge, is secured to the base plate, as by a screw 45 or other fastening means to effect a rigid assembly.

Rocking movement of the visor unit B is effected through the base plate by means of a knurled roller 46 located within easy reach of the operator. The roller is fixed to the end of an elongate horizontally disposed rod 47 which is operatively connected to an aligned rod 47a arranged endwise thereof and extending through an opening in the flange 12 and operatively engages a gear 48 that is rotatably carried between the laterally spaced walls 49 and 50 of a yoke member 51 secured to the under side of the base plate 30. In meshing relation with the gear 48 and rotatably supported between the walls of the same yoke member is a larger gear 52 to which one end of a connecting link 53 is pivoted, as at a position 54 offset from the center of rotation. The other end of the link 53 is pivoted, as at 55a, between a yoke member 56a fixed to the under side of the base plate 38 in advance of the axis of rocking movement for the unit B.

Responsive to rotational movement of the gear members 48 and 52 in one direction or the other, longitudinal travel is imparted to the link 53, which in turn causes the unit B to be rocked between raised and lowered positions of adjustment. It should be understood that other means well known in the trade, such as electrically operated means responsive to push button control or the like, may be used to actuate the rod or gear members to effect corresponding adjustment.

Stops are provided to limit the extent of swinging movement of unit B between raised and lowered positions of adjustment. A preferred stop arrangement is shown in Figures 4 and 7. The lowermost position to which the unit B may be rocked is controlled by the arrangement of parts whereby engagement is effected between an intermediate portion of the link 53 with a ledge 55 provided in the forward portion of the wall 49 of the yoke member 51. Upward swinging movement of the unit B is stopped when the end portion of link 53 contacts an abutment 56 provided in a lower portion of the same wall 49. Other means equally effective may be provided to limit the extent of swinging movement of the parts within the usable range.

Locking means are employed automatically to prevent inadvertent adjustment of the pivotal visor unit B, once its position has been established. The locking means illustrated herein as a preferred embodiment is adapted automatically to become ineffective for releasing the parts for adjustment upon actuation of the rod 47. Although other suitable locking means may be employed, a simple and novel arrangement, shown in Figures 8 and 9, embraces the use of a pin 57 slidable through an opening 58 in the wall 49. The pin has a U-shaped end portion 59 which is slidable through a pair of properly spaced openings 60 and 61 in wall 50. The leaf spring 62, secured at one end to the wall 50, rests against the bail of the U-shaped portion which extends beyond the wall 50, constantly to urge the pin in the direction to effect operative engagement with an annular flange 63 on the end of a sleeve 64 which is longitudinally slidable on the rod 47.

The rod members 47 and 47a are provided with a pair of longitudinally spaced pins 65 and 66. One pin is operative in a longitudinal slot 67 in the sleeve, the slot being dimensioned to limit the extent of relative longitudinal movement. The other pin 66 on rod member 47a is operative in a V-shaped slot 68 formed in the sleeve, wherein it is effective to cam the sleeve upwardly responsive to turning movement of the rod 47 in either direction. Responsive to such longitudinal displacement of the sleeve 64, the pin 57 is shifted in the same direction against the force of the spring member 62 for a distance to disengage the free end portion 69 from locking engagement with the gear teeth 70a of one or the other of the gear members. When actuating forces for adjustment of unit B are released, the leaf spring 62, or other resilient means which may be employed, becomes automatically effective to return the movable parts to their normal position of adjustment shown in Figure 8, wherein the end portion 69 operatively engages the gear teeth to prevent rotational movement.

An important concept of this invention resides in the construction and arrangement of parts by which the pivotal visor B is adapted to rock in the direction which conforms with the compound curvature of the windshield in the event that it is so shaped. To accomplish this end, the separate sections 40 and 41 are mounted about axes which extend at a slight angular relation from each other, as will be apparent from Figures 2 and 11. As the sections rock about separate axes, two additional movements conjointly occur, the adjacent ends of the sections converge or depart from each other during such movement by an amount depending upon the distance from the axis, and the sections rock normal to the direction of first rocking movement. Thus, the end portions actually shift in the lateral direction within the housing and in order to achieve proper unification and an attractive appearance, the cover plate is dimensioned to account for such lateral movement and for lateral adjustment corresponding to that effected over the entire assembly.

As shown in Figure 7, the inner end portion of the rod elements or braces 35 are offset to form integral rearwardly extending portions 70 and laterally extending portions 71, which are operative in curvilinear vertically disposed slots 72 in each of the members 36. The end sections 71 shift within the slots 72 during rocking movement and they serve as guide means which cooperate with the pivotal members 31 and 32 and which in addition might be used to determine the extent of swinging movement in the event that other means of the type previously described are not employed.

In operation, whenever the actuating rod 47 is turned in the clockwise or counter-clockwise direction, the sleeve section 64 is caused to turn and by reaction between pin 66 and the V-shaped slot 68, the sleeve section is inwardly displaced by an amount to render the locking pin 57 ineffective, so that the gears 48 and 52 are free for conjoint turning movement in a direction for effecting lowering or raising of the pivoted visor unit B in the manner described responsive to continued turning movement of rod 47 and rod 47a through the connecting sleeve 64. When the rod is turned in the clockwise direction, gear 52 rotates in the counter-clockwise direction so that the link 53 is forwardly displaced with the result that unit B is rocked about its pivots in the upwardly direction. At the upper limit of rocking movement, the adjacent ends of the pivoted visor sections 40 and 41 are nearest together as indicated by the solid lines in Figure 11. When the actuating forces are removed, the spring member 62 automatically becomes effective to return the pin 57 and the sleeve 64 to their normal positions of adjustment wherein the gear members are locked against inadvertent turning movement.

When the actuating rod is turned in the counterclockwise direction, gear 52 rotates in the clockwise direction with the result that the link 53 is displaced rearwardly and the pivoted visor unit B is rocked in the downward direction relative to the stationary member A. Upon such movement, the adjacent ends of sections 40 and 41 move outwardly within the housing defined by elements 38 and 39, but even when the unit B is adjusted to its lowermost position, the housing part completely conceals the spaced relation and is capable of its function as an element for unifying the movement of the separate sections of which unit B is composed.

It will be apparent from the foregoing that I have provided a new and improved visor assembly which employs a stationary visor unit fixed over the windshield of an automotive vehicle and an auxiliary visor unit pivoted from the stationary member for adjustment to various positions, notwithstanding the compound curvature and without departing from the streamlined effect of commercial vehicles in any position of adjustment.

It will be understood that numerous changes may be made in the details of construction, arrangement, and operation without departing from the spirit of the invention, especially as defined in the following claims.

What is claimed is:

1. A visor structure for the windshield of an automotive vehicle comprising an elongate visor unit stationarily positioned to extend in the forwardly direction over the windshield, another elongate visor unit extending forwardly of the stationarily mounted unit and pivoted therefrom for relative rocking movement in the vertical direction, and means for rocking the latter unit to the desired position of adjustment, said means including gear means secured to the stationarily mounted unit and positioned rearwardly of the pivoted unit, a link pivoted at one end to an eccentric portion of a gear in said gear means while the other end is operatively connected to the pivoted visor unit at a point in advance of and below its pivot, manually operable means for actuating the gear means, means for latching and unlatching said gear means operative in response to actuation of said manually operable means, whereby said latch means responds to actuating forces by the manual means to rock the visor to permit rotational movement of said gear means, and is operative upon cessation of said actuating forces to latch said gear means against movement.

2. A visor structure as claimed in claim 1 wherein the means for latching and unlatching the gear means, comprises a pin shiftable axially into and out of engagement with the gears, and spring means operative on the pin to urge the pin constantly to engage the gear means.

3. A visor structure for automotive windshields of compound curvature comprising an elongate visor member having a curvature generally corresponding to the windshield and stationarily positioned thereover to extend in a forwardly direction, another visor unit pivoted to the underside of the stationarily positioned member for rocking movement in the vertical direction, the latter unit being formed of two plate members in side by side spaced relation pivoted about separate axes lying in the same plane but at an angle slightly less than 180° to each other, and a cover plate in which the inner spaced ends of the visor plate members are positioned for lateral shifting movement but movable therewith in the vertical direction and dimensioned to conceal the variable spaced apart end portions of the plates occasioned by rocking movement of the plates about said axes and to permit an amount of lateral adjustment for specific widths.

4. A visor structure for automotive windshields of compound curvature comprising an elongate visor member having a curvature generally corresponding to the windshield and stationarily positioned thereover to extend in a forwardly direction, another visor unit pivoted to the underside of the stationarily positioned member for rocking movement in the vertical direction, the latter unit being formed of two plate members in side by side spaced relation pivoted about separate axes lying in the same plane but at an angle slightly less than 180° to each other, elongate rods turned at their outer end portions to correspond to the contour at the rearward portion of the plate members to which they are fixed, the inner ends of the rods being offset, and plates rigid with the stationary member having arcuate slots in which said offset portions are operative.

5. A visor structure as claimed in claim 1 in which the means for releasing said latching means comprises an actuating rod, another rod in alignment therewith on which the gear means is located, a sleeve member telescoping over the adjacent end portions of the aligned rods, interconnecting pin and slot means in the actuating rod and sleeve to limit relative axial movement of said sleeve relative the rods, interconnecting pin and V-slot means in the other rod and sleeve, a pin shiftable normally into engagement with a gear of said gear means to prevent rotational movement and having a portion positioned in the path of the sleeve whereby the pin is displaced from latching engagement with said gear responsive to displacement of said sleeve during rotational movement of the gear actuating means.

6. A visor structure for the windshield of an automotive vehicle comprising an elongate visor unit stationarily positioned to extend in a forwardly direction over the windshield, another elongate visor unit extending forwardly of the stationarily mounted unit and pivoted therefrom for relative rocking movement in the up and down direction, means for rocking the latter unit to the desired position of adjustment including gear means located immediately below the stationary visor unit and concealed thereby, laterally extending rod means accessible from the side of the vehicle for actuating said gear means in one direction or the other for raising and lowering the pivoted visor member, a substantially horizontally disposed link pivoted at one end portion to an eccentric portion of the gear means while the other end is pivotally connected to the adjustable visor unit at a point in advance of and below its pivot, means normally urged into engagement with said gear means for latching same against rotational movement for raising and lowering the adjustable visor unit, and means operatively connected with said manually actuated rod for adjusting said latching means out of engagement with said gear means responsive to operation thereof for adjusting the visor unit.

7. A visor structure for automotive windshields of compound curvature comprising an elongate visor member having a curvature generally corresponding to the windshield and stationarily positioned thereover to extend in a forwardly direction, another visor unit pivoted to the underside of the stationarily positioned member for rocking movement in the vertical direction, the latter visor unit being formed of two plate members in side by side spaced relation pivoted about separate axes in angular relation with each other, a cover plate and a bottom plate interconnected with the cover plate to define a space therebetween in which the inner ends of the visor plate members are positioned for lateral sliding movement and by which they are guided for rocking movement and dimensioned to conceal the spaced apart end portions of the plates by an amount to conceal their variable spaced relation occasioned by rocking movement of the plates about their axes.

8. A visor structure for automotive windshields of compound curvature comprising an elongate visor member having curvature generally corresponding to the windshield and stationarily positioned thereover to extend in a forwardly direction, another visor unit pivoted from the underside of the stationarily positioned member for rocking movement, the latter unit being formed of two visor sections in side by side spaced relation and pivoted along their rearward edges about separate axes at an angle slightly less than 180° with each other, interconnected top and bottom plates defining a space therebetween in which the adjacent inner ends of the visor sections are laterally slidable and guided in vertical movement and dimensioned to receive the inner end portions of the visor sections in sliding relation to conceal the ends notwithstanding variation in spaced relation occasioned during rocking movement of the sections about their respective axes, manually operated gear means on the stationary visor member, and a link connecting an offset portion of a gear in said gear means with an extension forwardly and rearwardly below the axes of the plates for rocking the plates and their associated visor sections about their axes during rotational movement of said gear.

9. A visor structure for automotive windshields of compound curvature comprising an elongate visor member having a curvature generally corresponding to the windshield and stationarily positioned thereover to extend in a forwardly direction, another visor unit pivoted to the underside of the stationarily positioned member for rocking movement in the vertical direction, the latter visor unit being formed of two plate members in side by side spaced relation pivoted about separate axes in angular relation with each other, a cover plate and a bottom plate interconnected therewith to define a space therebetween in which the adjacent inner ends of the visor members are slidable laterally and dimensioned to conceal the spaced apart end portions of the plates by an amount to conceal their variable spaced relation occasioned by rocking movement of the plates about their axes, reinforcing rod members extending lengthwise through the rear edge portion of the visor sections and along their axes of rotation, an inwardly and laterally extending portion integral with the inner ends of the reinforcing rods, and a plate depending from the stationary visor member and having curvilinear guide slots in which said laterally extending end portions of the rods are operative to guide pivotal movement of the visor members.

FREDERICK A. KRUSEMARK.

References Cited in the file of this patent

UNITED STATES PATENTS

| Number | Name | Date |
| --- | --- | --- |
| 1,525,832 | Sterling | Feb. 10, 1925 |
| 1,613,296 | Seaman | Jan. 4, 1927 |
| 1,688,578 | Feilcke | Oct. 23, 1928 |
| 1,807,879 | Simon | June 2, 1931 |
| 2,497,050 | Thibault | Feb. 7, 1950 |

FOREIGN PATENTS

| Number | Country | Date |
| --- | --- | --- |
| 719,898 | France | Feb. 12, 1932 |